US011536063B2

(12) United States Patent
Miyashiro et al.

(10) Patent No.: US 11,536,063 B2
(45) Date of Patent: Dec. 27, 2022

(54) DOOR CONTROL DEVICE

(71) Applicant: AISIN CORPORATION, Aichi (JP)

(72) Inventors: Ryu Miyashiro, Kariya (JP); Kosuke Kito, Kariya (JP)

(73) Assignee: AISIN CORPORATION, Kariya (JP)

( * ) Notice: Subject to any disclaimer, the term of this patent is extended or adjusted under 35 U.S.C. 154(b) by 541 days.

(21) Appl. No.: 16/676,604

(22) Filed: Nov. 7, 2019

(65) Prior Publication Data

US 2020/0149329 A1 May 14, 2020

(30) Foreign Application Priority Data

Nov. 9, 2018 (JP) .............................. JP2018-211381

(51) Int. Cl.
*G06F 7/70* (2006.01)
*E05C 17/20* (2006.01)
(Continued)

(52) U.S. Cl.
CPC ............. *E05C 17/203* (2013.01); *B60J 5/047* (2013.01); *B60T 7/22* (2013.01); *E05B 81/64* (2013.01);
(Continued)

(58) Field of Classification Search
CPC .. B60J 5/047; B60T 7/22; E05B 81/64; E05B 83/36; E05C 17/003; E05C 17/203;
(Continued)

(56) References Cited

U.S. PATENT DOCUMENTS 10,960,900 B1 * 3/2021 Crouch ................. G01S 7/4914
11,334,063 B2 * 5/2022 Cella ...................... G06N 3/088
(Continued)

FOREIGN PATENT DOCUMENTS

DE    10 2004 020 426 A1    11/2005
DE    10 2008 041 354 A1    2/2010
(Continued)

OTHER PUBLICATIONS

Office Action dated Aug. 23, 2022, in corresponding Japanese Patent Application No. 2018-211381 (with English Translation), 6 pages.

*Primary Examiner* — Chi Q Nguyen
(74) *Attorney, Agent, or Firm* — Oblon, McClelland, Maier & Neustadt, L.L.P.

(57) ABSTRACT

A door control device stops a door such that the door does not come into contact with an obstacle existing in a rotation range of the door. The door control device includes: a distance calculation unit configured to calculate a distance from the door to the obstacle; a speed calculation unit configured to calculate an actual speed of the door; a braking force setting unit configured to set a braking condition indicating transition of a braking force applied to the door; a speed estimation unit configured to estimate transition of an estimated speed of the door from start of braking until the door stops; and a braking force correction unit configured, during braking, to correct a braking force such that the braking force is increased, or reduced, when a time gradient of the actual speed is gentler than, or steeper than, that of the estimated speed.

6 Claims, 4 Drawing Sheets

(51) Int. Cl.
  *B60T 7/22* (2006.01)
  *E05B 81/64* (2014.01)
  *B60J 5/04* (2006.01)
  *E05B 83/36* (2014.01)
  *E05C 17/00* (2006.01)
  *E05F 15/42* (2015.01)

(52) U.S. Cl.
  CPC ............ *E05B 83/36* (2013.01); *E05C 17/003* (2013.01); *E05F 2015/483* (2015.01); *E05Y 2201/21* (2013.01); *E05Y 2400/44* (2013.01); *E05Y 2900/531* (2013.01)

(58) Field of Classification Search
  CPC ........... E05F 2015/483; E05Y 2201/21; E05Y 2400/44; E05Y 2900/531
  USPC .......................................................... 701/70
  See application file for complete search history.

(56) References Cited

U.S. PATENT DOCUMENTS

| | | | |
|---|---|---|---|
| 2015/0218871 A1* | 8/2015 | Fukui | E05C 17/203 340/686.6 |
| 2018/0162387 A1* | 6/2018 | Sung | B60W 10/06 |
| 2019/0126750 A1* | 5/2019 | Kim | B60W 50/16 |
| 2019/0128040 A1* | 5/2019 | Mitchell | E05F 15/40 |
| 2019/0154815 A1* | 5/2019 | Oohata | G01S 7/4868 |
| 2019/0235246 A1* | 8/2019 | Hu | G06F 3/011 |
| 2020/0031283 A1* | 1/2020 | Nakasho | B60R 1/002 |
| 2020/0062308 A1* | 2/2020 | Kim | B60W 30/06 |
| 2020/0291708 A1* | 9/2020 | Kimura | B60J 5/106 |

FOREIGN PATENT DOCUMENTS

| | | |
|---|---|---|
| JP | 2009-143251 A | 7/2009 |
| JP | 2016-538442 A | 12/2016 |

\* cited by examiner

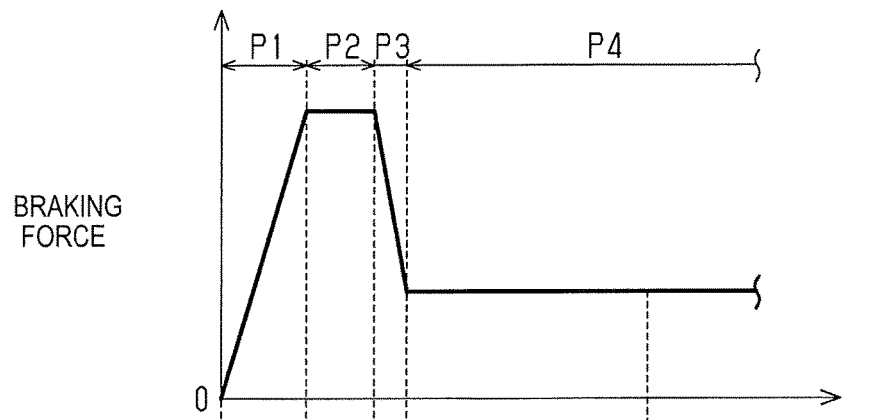
FIG. 3A
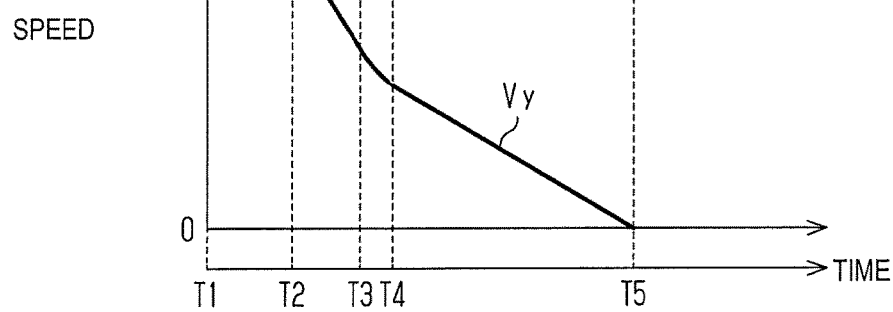
FIG. 3B
FIG.4
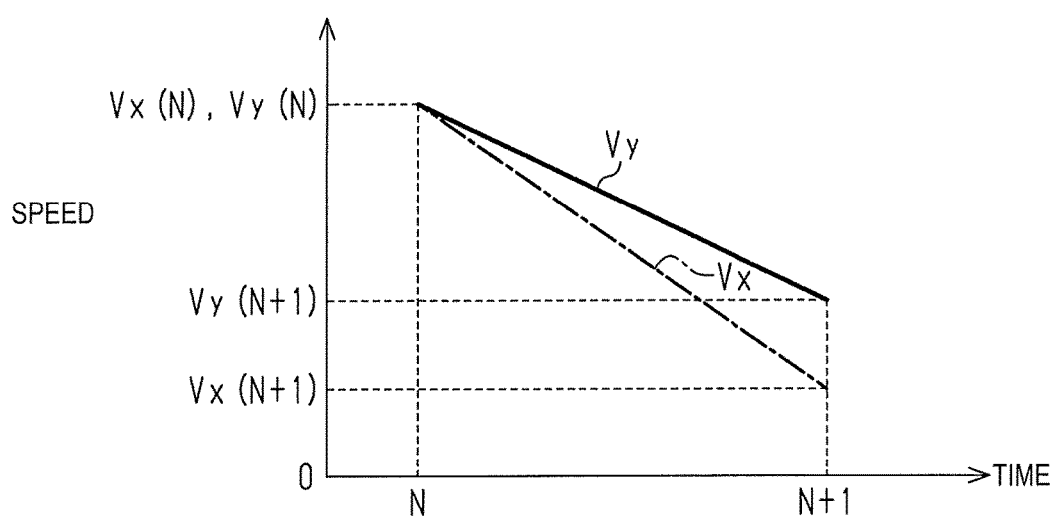

DOOR CONTROL DEVICE

CROSS REFERENCE TO RELATED APPLICATIONS

This application is based on and claims priority under 35 U.S.C. § 119 to Japanese Patent Application 2018-211381, filed on Nov. 9, 2018, the entire contents of which are incorporated herein by reference.

TECHNICAL FIELD

This disclosure relates to a vehicle door control device.

BACKGROUND DISCUSSION

JP 2009-143251A (Reference 1) discloses, as an example of a door control device, a door opening/closing control device including an opening angle calculation unit that calculates an opening angle as an openable angle of a door based on the distance from the door to an object adjacent to the door and a door opening control unit that increases a braking torque for the door according to an increase in the opening angle of the door. The door opening/closing control device prevents the door from colliding with an adjacent vehicle or obstacle by braking the door when an occupant opens the door.

The door opening/closing control device as described above starts door braking control under a condition that the opening angle of the door becomes a predetermined control start angle. Therefore, the door opening/closing control device as described above has a possibility of a change in the stop position of the door according to an opening speed of the door when the opening angle of the door becomes the control start angle. For example, the door opening/closing control device as described above has a possibility of stopping the door at a position away from an adjacent object even when it is desired to stop the door at a position relatively close to the adjacent object. Thus, a need exists for a door control device which is not susceptible to the drawback mentioned above.

SUMMARY

Hereinafter, aspects of this disclosure will be described.

A door control device according an aspect of this disclosure stops a door rotatably supported by a vehicle body such that the door does not come into contact with an obstacle existing in a rotation range of the door by controlling a braking device that brakes the doors. The door control device includes a distance calculation unit configured to calculate a distance from the door to the obstacle, a speed calculation unit configured to calculate an actual speed of the door, a braking force setting unit configured to set a braking condition indicating transition of a braking force applied to the door, a speed estimation unit configured to estimate, on the basis of the current actual speed, transition of an estimated speed of the door from start of braking based on the braking condition until the door stops, and a braking force correction unit configured to correct, during braking based on the braking condition, a braking force based on the braking condition such that the braking force is increased when a time gradient of the actual speed is gentler than a time gradient of the estimated speed and to correct the braking force based on the braking condition such that the braking force is reduced when the time gradient of the actual speed is steeper than the time gradient of the estimated speed.

A door control device according to another aspect of this disclosure stops a door rotatably supported by a vehicle body such that the door does not come into contact with an obstacle existing in a rotation range of the door by controlling a braking device that brakes the door. The door control device includes a controller, and the controller is configured to calculate a distance from the door to the obstacle, calculate an actual speed of the door, set a braking condition indicating transition of a braking force applied to the door, estimate, on the basis of the current actual speed, transition of an estimated speed of the door from start of braking based on the braking condition until the door stops, and, during braking based on the braking condition, correct a braking force based on the braking condition such that the braking force is increased when a time gradient of the actual speed is gentler than a time gradient of the estimated speed and correct the braking force based on the braking condition such that the braking force is reduced when the time gradient of the actual speed is steeper than the time gradient of the estimated speed.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a timing chart illustrating transition of a braking force based on a braking condition and FIG. 3B is a timing chart illustrating transition of an estimated speed;

FIG. 4 is a timing chart illustrating an example of a relationship between an actual speed and an estimated speed;

DETAILED DESCRIPTION

Hereinafter, an embodiment of a door control device for a door will be described.

Figure 1:
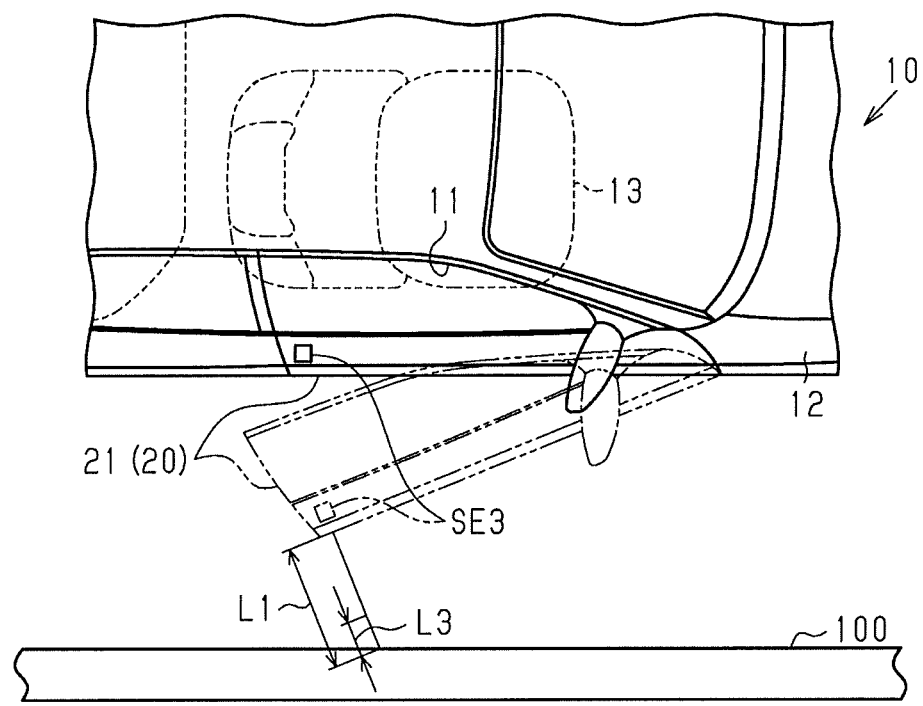
FIG. 1 is a plan view illustrating a schematic configuration of a vehicle.
Figure 2:
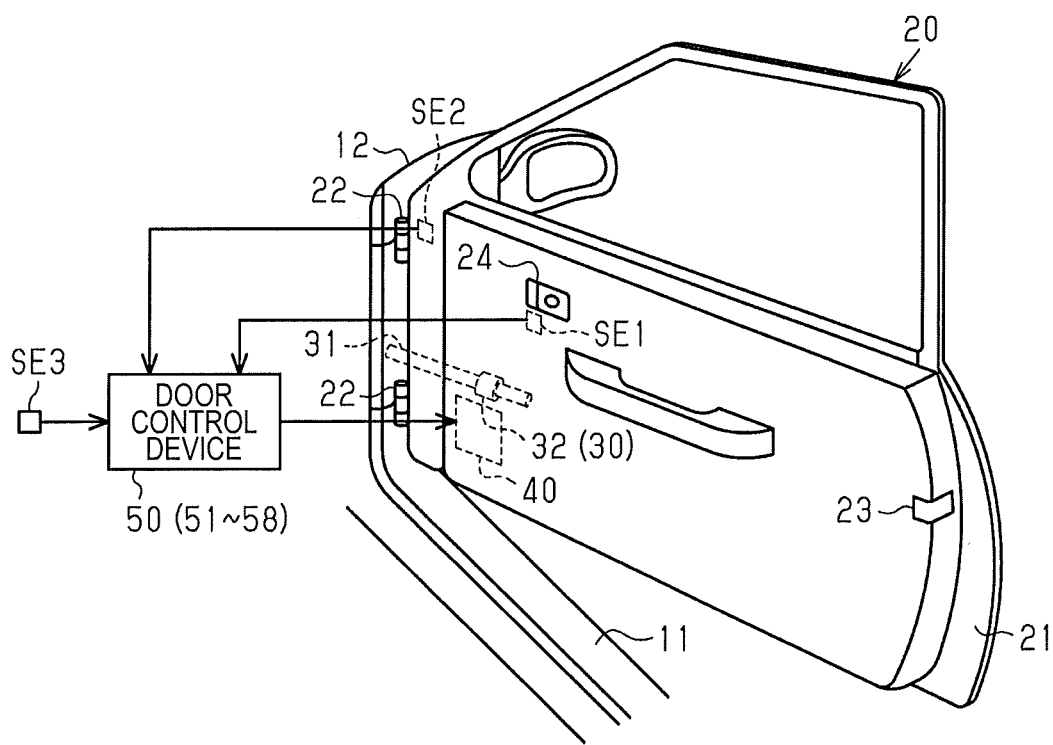
FIG. 2 is a perspective view illustrating a schematic configuration of the vehicle.

As illustrated in FIGS. 1 and 2, a vehicle 10 includes a vehicle body 12 having a door opening 11 formed in a side surface thereof, a seat 13 disposed in a room of the vehicle 10, a door 20 which opens and closes the door opening 11, a door check device 30 which restricts the opening degree of the door 20 at a fully open position, a braking device 40 which applies a braking force to the door 20, and a door control device 50 which controls driving of the braking device 40.

The door 20 includes a door body 21, a door hinge 22 which rotatably interconnects the vehicle body 12 and the door body 21, a door lock device 23 which restrains the door body 21 to the vehicle body 12, and an inside door handle 24 which is operated by an occupant when releasing restraint of the door lock device 23.

A front end portion of the door body 21 is rotatably supported by the door hinge 22. Thus, the door body 21 (door 20) rotates, around a rotation axis extending in the height direction of the vehicle 10, between a fully closed position where the door body 21 closes the door opening 11 and a fully open position where the door body 21 opens the door opening 11. That is, the door 20 of the present embodiment is a so-called swing door.

The door lock device 23 includes a latch mechanism (not illustrated) which is switched between a locked state where the door body 21 located at the fully closed position is restrained to the vehicle body 12 and an unlocked state where restraint of the door body 21 located at the fully closed position with respect to the vehicle body 12 is released. When a user operates the inside door handle 24, the latch mechanism shifts from the locked state to the unlocked state. As a result, the user may open the door 20.

As illustrated in FIGS. 1 and 2, the door 20 includes a handle switch SE1 which detects an operation of the inside door handle 24, a rotation angle sensor SE2 which detects a rotation angle around the rotation axis of the door 20, and a distance sensor SE3 which detects the distance to an obstacle 100 existing in the rotation range of the door 20.

The handle switch SE1 may be a switch that is switched on and off according to an operation situation of the inside door handle 24. The handle switch SE1 outputs a detection signal corresponding to the operation situation of the inside door handle 24 to the door control device 50. The rotation angle sensor SE2 may be a sensor such as, for example, a Hall element or a rotary encoder. The rotation angle sensor SE2 outputs a detection signal corresponding to the rotation angle of the door 20 to the door control device 50. The distance sensor SE3 may be a sensor that uses light, sound waves, radio waves, or the like. The distance sensor SE3 outputs a detection signal corresponding to the distance from the door 20 to the obstacle 100 to the door control device 50. The obstacle 100 is, for example, another vehicle parked next to the own vehicle, a fence or a house located next to the own vehicle, or a person standing next to the own vehicle.

The door check device 30 includes a rod-shaped check link 31 and a sliding component 32 which slides on the check link 31. The check link 31 has a proximal end portion rotatably connected to the vehicle body 12 and a distal end portion extending into the door body 21. The sliding component 32 is fixed to the door body 21. When the door is opened to the fully open position, the proximal end portion of the check link 31 is engaged with the sliding component 32, so that the door check device 30 defines the fully open position of the door 20.

The braking device 40 brakes the door 20 by applying an arbitrary braking force (braking torque) to the door 20 that is being opened. The braking device 40 is configured so as to be capable of varying the braking force applied to the door 20 by input of a control signal. For example, the braking device 40 changes a frictional force acting on the door hinge 22 or changes a sliding resistance between the check link 31 and the sliding component 32 of the door check device 30 to vary the braking force for the door 20.

Next, the door control device 50 will be described in detail.

The door control device 50 controls the braking device 40 to stop the door 20 such that the door 20 does not come into contact with the obstacle 100 existing in the rotation range of the door 20 when the occupant opens the door 20. As illustrated in FIG. 2, the door control device 50 includes a distance calculation unit 51, a position calculation unit 52, a speed calculation unit 53, a braking force setting unit 54, a speed estimation unit 55, a braking force correction unit 56, a stop distance estimation unit 57, and a braking start determination unit 58.

The distance calculation unit 51 calculates the distance from the door 20 to the obstacle 100 existing in the rotation range of the door 20 on the basis of a detection signal output from the distance sensor SE3. As illustrated in FIG. 1, in the following description, the distance from the door 20 to the obstacle 100 is referred to as "distance L1".

The position calculation unit 52 calculates the position (opening degree) of the door on the basis of a detection signal output from the rotation angle sensor SE2.

The speed calculation unit 53 calculates the actual speed of the door 20 (hereinafter also referred to as "actual speed Vx") on the basis of a temporal change in the position of the door calculated by the position calculation unit 52. The actual speed Vx may be said to be the speed of the door 20 calculated on the basis of a detection signal of the rotation angle sensor SE2. In the present embodiment, the actual speed Vx is the speed at the center position of the door 20. That is, the actual speed Vx may be obtained by multiplying the distance from the rotation center of the door 20 to the center position of the door 20 by the angular speed of the door 20. In addition, the dimension of the actual speed Vx is a dimension obtained by dividing the distance by the time.

The braking force setting unit 54 sets a braking condition indicating transition of the braking force applied to the door 20. The braking condition is a condition that determines a change in the magnitude of the braking force applied to the door 20 with the lapse of time. An example of the braking condition will be described with reference to a timing chart illustrated in FIG. 3A.

As illustrated in FIG. 3A, in a first period P1 from a first timing T1 to a second timing T2, the braking force is gradually increased with the lapse of time. The first period P1 is a period of gradually increasing the deceleration of the door 20 immediately after braking is started, and is a period for slowly starting braking. In a second period P2 from the second timing T2 to a third timing T3, a relatively large braking force at the end of the first period P1 is maintained. The second period P2 is a period of mainly decelerating the door 20 by maintaining the relatively large braking force. In a third period P3 from the third timing T3 to a fourth timing T4, a braking force at the end of the second period P2 is gradually reduced with the lapse of time. The third period P3 is a period of gradually reducing the deceleration of the door 20 by gradually reducing the braking force. In a fourth period P4 after the fourth timing T4, a relatively small braking force at the end of the third period P3 is maintained. The fourth period P4 is a period of slowly stopping the door 20 by maintaining the small braking force, and is a period for slowly stopping braking.

The speed estimation unit 55 estimates transition of a speed (hereinafter also referred to as "estimated speed Vy") until the door 20 stops when a braking force based on a braking condition is applied to the door 20 on the basis of the speed of the door 20 when braking is started and the passed time after braking is started. FIG. 3B is a timing chart illustrating transition of the estimated speed Vy when the speed of the door 20 at the start of barking is the speed Va. In addition, transition of the estimated speed Vy illustrated in FIG. 3B may be calculated by solving the equation of motion when the braking force based on the braking condition is applied to the door 20 that is being opened.

As illustrated in FIGS. 3A and 3B, in the first period P1 from the first timing T1 to the second timing T2, since the braking force is increased, the deceleration gradient of the estimated speed Vy gradually becomes steep with the lapse of time. Subsequently, in the second period P2 from the second timing T2 to the third timing T3, since the braking force at the end of the first period P1 is maintained, the deceleration gradient of the estimated speed Vy becomes consistently steep. Then, in the third period P3 from the third timing T3 to the fourth timing T4, since the braking force is reduced, the deceleration gradient of the estimated speed Vy gradually becomes gentle with the lapse of time. Finally, in the period (fourth period P4) from the fourth timing T4 to a fifth timing T5 when the estimated speed Vy becomes "0", since the braking force at the end of the third period P3 is maintained, the deceleration gradient of the estimated speed Vy becomes consistently gentle.

As described above, the speed estimation unit 55 estimates transition of the estimated speed Vy depending on the braking force based on the braking condition. The speed estimation unit 55 may calculate a discrete estimated speed Vy until the door 20 stops at the timing when braking based on the braking condition is started, or may calculate the estimated speed Vy at every timing when a predetermined time has passed after braking based on the braking condition is started.

In FIGS. 3A and 3B, however, when the speed of the door 20 at the start of braking is lower than the speed Va, the door 20 may stop before the fourth timing T4, and when the speed of the door 20 at the start of braking is higher than the speed Va, the door 20 may stop after a long time has passed from the fifth timing T5. Therefore, in the present embodiment, a braking start timing based on a braking condition is determined such that the door 20 stops at an appropriate timing by determination of the braking start determination unit 58 to be described later. For example, the timing when the braking force based on the braking condition is applied is determined such that the passed time from the first timing T1 when braking is started to the fifth timing T5 when the door 20 stops ranges from 0.5 seconds to less than 1.0 seconds.

The braking force correction unit 56 compares the time gradient Ax of the actual speed Vx with the time gradient Ay of the estimated speed Vy in each predetermined cycle (hereinafter also referred to as "correction cycle PC") during braking based on the braking condition. For example, the correction cycle PC may be set to about 100 milliseconds. Then, when the time gradient Ax of the actual speed Vx becomes steeper than the time gradient Ay of the estimated speed Vy in a current correction cycle PC, the braking force correction unit 56 corrects the braking force based on the braking condition in a next correction cycle PC such that the braking force is reduced. In other words, when the deceleration of the actual speed Vx is larger than the deceleration of the estimated speed Vy in the current correction cycle PC, the braking force correction unit 56 corrects the braking force based on the braking condition in the next correction cycle PC such that the braking force is reduced. Further, when the time gradient Ax of the actual speed Vx becomes gentler than the time gradient Ay of the estimated speed Vy in the current correction cycle PC, the braking force correction unit 56 corrects the braking force based on the braking condition in the next correction cycle PC such that the braking force is increased. In other words, when the deceleration of the actual speed Vx is smaller than the deceleration of the estimated speed Vy in the current correction cycle PC, the braking force correction unit 56 corrects the braking force based on the braking condition in the next correction cycle PC such that the braking force is increased. In addition, when the time gradient Ax of the actual speed Vx is equal to the time gradient Ay of the estimated speed Vy in the current correction cycle PC, the braking force correction unit 56 does not correct the braking force based on the braking condition in the next correction cycle PC.

Specifically, when correcting the braking force based on the braking condition, the braking force correction unit 56 calculates a braking force difference $\Delta F$ which is a value obtained by subtracting a braking force actually applied to the door 20 for the current correction cycle PC from the braking force based on the braking condition in the current correction cycle PC. Then, a corrected braking force obtained by adding the calculated braking force difference $\Delta F$ to the braking force based on the braking condition in the next correction cycle PC is set to a braking force applied to the door 20 in the next correction cycle PC. Therefore, when the braking force actually applied to the door 20 in the current correction cycle PC is less than the braking force based on the braking condition, the braking force based on the braking condition in the next correction cycle PC is corrected so as to be increased. Meanwhile, when the braking force actually applied to the door 20 exceeds the braking force based on the braking condition in the current correction cycle PC, the braking force based on the braking condition in the next correction cycle PC is corrected so as to be reduced.

For example, as illustrated in FIG. 4, a case where, in a correction cycle PC from an Nth timing to an (N+1)th timing, the actual speed Vx changes from the actual speed Vx(N) to the actual speed Vx(N+1) and the estimated speed Vy changes from the estimated speed Vy(N) to the estimated speed Vy(N+1) is assumed. Here, the actual speed Vx(N) and the estimated speed Vy(N) are equal to each other.

In this case, the time gradient $Ax(=(Vx(N+1)-Vx(N))/PC)$ of the actual speed Vx obtained by dividing a value which is obtained by subtracting the actual speed Vx(N) from the actual speed Vx(N−1) by the correction period PC is different from the time gradient $Ay(=(Vy(N+1)-Vy(N))/PC)$ of the estimated speed Vy obtained by dividing a value which is obtained by subtracting the estimated speed Vy(N) from the estimated speed Vy(N+1) by the correction period PC. This indicates that an external force different from the braking force based on the braking condition is applied to the door 20 in the correction cycle PC from the Nth timing to the (N+1)th timing due to influence of disturbance and the like. For example, the external force acts on the door 20 when the wind hits the door 20, acts on the door 20 when the stop place of the vehicle 10 is a slope, or acts on the door 20 when the occupant varies a force of pushing the door 20.

Then, the braking force correction unit 56 corrects the braking force based on the braking condition in a next correction cycle PC from the (N+1)th timing to an (N+2)th timing. Specifically, the braking force correction unit 56 adds the braking force difference $\Delta F$ which is a value obtained by subtracting a braking force Fx actually applied to the door 20 in the current correction cycle PC from a braking force Fy based on the braking condition in the current correction cycle PC to the braking force Fy based on the braking condition in the next correction cycle PC. That is, the braking force difference $\Delta F$ of the current correction cycle PC is the correction amount of the braking force Fy based on the braking condition of the next correction cycle PC. Here, when the mass of the door 20 is M, the braking force difference $\Delta F$ of the current correction cycle PC is expressed by the following equation.

$$\Delta F = Fy - Fx = M \cdot Ay - M \cdot Ax = \quad (1)$$
$$M \cdot (Vy(N+1) - Vy(N))/PC - M \cdot (Vx(N+1) - Vx(N))/PC$$

The stop distance estimation unit 57 estimates a stop distance (hereinafter also referred to as "stop distance L2") from the start of braking based on the braking condition until the door 20 stops based on the current actual speed Vx. As described above, when the braking force based on the braking condition illustrated in FIG. 3A is applied to the door 20, the speed of the door 20 at the timing when braking based on the braking condition is started is correlated with the stop distance L2 until the door 20 stops. Therefore, the stop distance estimation unit 57 may estimate the stop distance L2 depending on the current actual speed Vx with reference to the approximate expression prepared in advance.

For example, the approximate expression indicating a relationship between the current speed of the door 20 and the stop distance L2 may be derived by solving the equation of motion when the braking force based on the braking condition is applied to the door 20 while changing the magnitude of an initial speed. Specifically, first, in a situation where the braking force based on the braking condition is applied to the door 20, the movement distance of the door 20 until the speed of the door 20 changes from an arbitrary initial speed (=the speed of the door 20 at the start of braking) to "0" is obtained while changing the magnitude of the initial speed. Subsequently, the approximate expression is derived from a relationship between obtained multiple initial speeds and the movement distance of the door 20. The derived approximate expression may be stored in a memory of the door control device 50 when the vehicle 10 is assembled.

The braking start determination unit 58 determines, on the basis of the current distance L1 from the door 20 to the obstacle 100 and the stop distance L2, a braking start timing based on the braking condition. Specifically, the braking start determination unit 58 starts to apply the braking force based on the braking condition when the distance from the current position of the door 20 to the target stop position is equal to or less than the stop distance L2 estimated by the stop distance estimation unit 57. Here, the target stop position is a position before a position where the door 20 comes into contact with the obstacle 100, and as illustrated in FIG. 1, is spaced apart from the obstacle 100 by a reference distance (hereinafter also referred to as "reference distance L3"). Therefore, the distance from the current position to the target stop position is a distance obtained by subtracting the reference distance L3 from the distance L1. Further, the reference distance L3 may be appropriately set within a range, for example, from several centimeters to several tens of centimeters.

Next, the flow of a processing executed by the door control device 50 for braking the door 20 will be described with reference to a flowchart illustrated in FIG. 5. This processing is a processing executed in a predetermined control cycle when the vehicle 10 is in a stop state.

Figure 5:
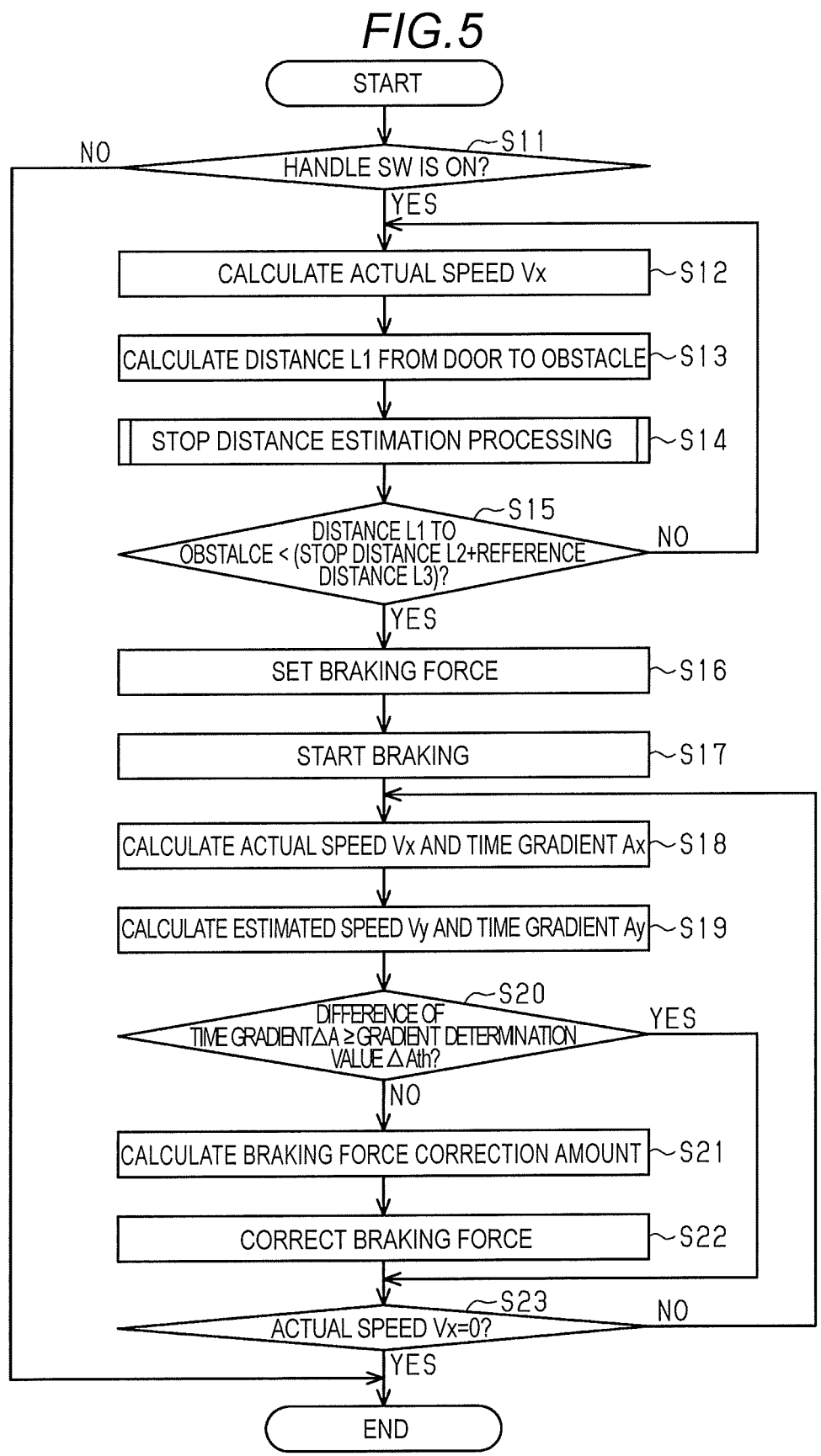
FIG. 5 is a flowchart illustrating a processing performed by a door control device for braking a door.

As illustrated in FIG. 5, the door control device 50 determines whether or not the handle switch SE1 is On (step S11). When the handle switch SE1 is Off (step S11: NO), i.e., when the occupant may not open the door 20 from the vehicle room side, the door control device 50 ends this processing. Meanwhile, when the handle switch SE1 is On (step S11: YES), i.e., when the occupant may open the door 20 from the vehicle room side, the door control device 50 calculates the position of the door 20 and calculates the actual speed Vx on the basis of a detection signal from the rotation angle sensor SE2 (step S12). Subsequently, the door control device 50 calculates the distance L1 from the door 20 to the obstacle 100 on the basis of a detection signal from the distance sensor SE3 (step S13).

Then, the door control device 50 executes a stop distance estimation processing (step S14). That is, the door control device 50 estimates the stop distance L2 corresponding to the actual speed Vx calculated in step S12 on the basis of a preset estimation equation. Thereafter, the door control device 50 determines whether or not the distance L1 from the door 20 to the obstacle 100 is less than the sum of the stop distance L2 and the reference distance L3 (step S15).

When the distance L1 from the door 20 to the obstacle 100 is equal to or greater than the sum of the stop distance L2 and the reference distance L3 (step S15: No), i.e., when the door 20 may stop before the target stop position even if braking based on a braking condition is not started at the current timing, the door control device 50 proceeds to the previous step S12. Here, the determination in step S15 is repeatedly executed for each predetermined determination cycle PD when the determination in step S15 is negative. The determination cycle PD is a cycle in which the braking start determination unit 58 determines whether or not to start braking based on the braking condition. Further, the determination cycle PD is shorter than the correction cycle PC, and is set to about 5 milliseconds as an example.

Meanwhile, when the distance L1 from the door 20 to the obstacle 100 is less than the sum of the stop distance L2 and the reference distance L3 (step S15: YES), i.e., when the door 20 may not stop at the target stop position unless braking based on the braking condition is started at the current timing, the door control device 50 sets a braking force based on the braking condition (step S16). Specifically, the door control device 50 sets the braking force at a braking start timing with reference to the map illustrated in FIGS. 3A and 3B. In the present embodiment, since the braking force at the braking start timing (first timing T1) is "0", the braking force is set to "0" in step S16. Thereafter, the door control device 50 starts braking by the braking device 40 (step S17).

Subsequently, the door control device 50 calculates the position of the door 20 and calculates the actual speed Vx and the time gradient Ax of the actual speed Vx on the basis of a detection signal from the rotation angle sensor SE2 (step S18). Thereafter, the door control device 50 calculates the estimated speed Vy of the door 20 and the time gradient Ay of the estimated speed Vy based on the braking condition and the time since the start of braking (step S19). In addition, steps S18 and S19 are executed for each correction cycle PC described above. Therefore, the time gradient Ax of the actual speed Vx is a gradient indicating the amount of a change in the actual speed Vx in the correction cycle PC, and the time gradient Ay of the estimated speed Vy is a gradient indicating the amount of a change in the estimated speed Vy in the correction cycle PC.

Thereafter, the door control device 50 determines whether or not a time gradient difference ΔA which is the magnitude of the difference between the time gradient Ax of the actual speed Vx and the time gradient Ay of the estimated speed Vy is equal to or greater than a gradient determination value ΔAth (step S20). The gradient determination value ΔAth is a threshold value for preventing the braking force from being corrected on the basis of the time gradient Ax of the erroneous actual speed Vx when the actual speed Vx includes a large calculation error. Further, the execution cycle of step S20 is the correction cycle PC, and is a cycle of determining whether or not to correct the braking force based on the braking condition by the braking force correction unit 56.

In step S20, when the time gradient difference ΔA is equal to or greater than the gradient determination value ΔAth (step S20: YES), the door control device 50 proceeds to S23 to be described later. In this case, the braking force based on the braking condition is not corrected.

Meanwhile, when the time gradient difference ΔA is less than the gradient determination value ΔAth (step S20: NO), the door control device 50 calculates, using the above-described Equation (1), a braking force correction amount (=braking force difference ΔF) in a next correction cycle PC on the basis of the time gradient Ax of the actual speed Vx and the time gradient Ay of the estimated speed Vy in a current correction cycle PC (step S21). Thereafter, the door control device 50 corrects the braking force based on the braking condition in the next correction cycle PC on the basis of the braking force correction amount calculated in step S21 (step S22). Specifically, the braking force in the next correction cycle PC is calculated by adding the braking force correction amount calculated in step S21 to the braking force based on the braking condition corresponding to the passed time since the start of braking.

Then, the door control device 50 determines whether or not the actual speed Vx of the door 20 calculated in step S18 is "0" (step S23). When the actual speed Vx of the door 20 is "0" (step S23: YES), i.e., when the door 20 stops, the door control device 50 ends this processing. Meanwhile, when the actual speed Vx of the door 20 is not "0" (step S23: NO), i.e., when the door 20 is not in the stop state, the door control device 50 proceeds to step S18.

Although not illustrated in FIG. 5, it is preferable that the door control device 50 stops the processing when the door 20 stops while a state in which the determination in step S15 is negative continues.

An action of the present embodiment will be described.

Figure 6A:
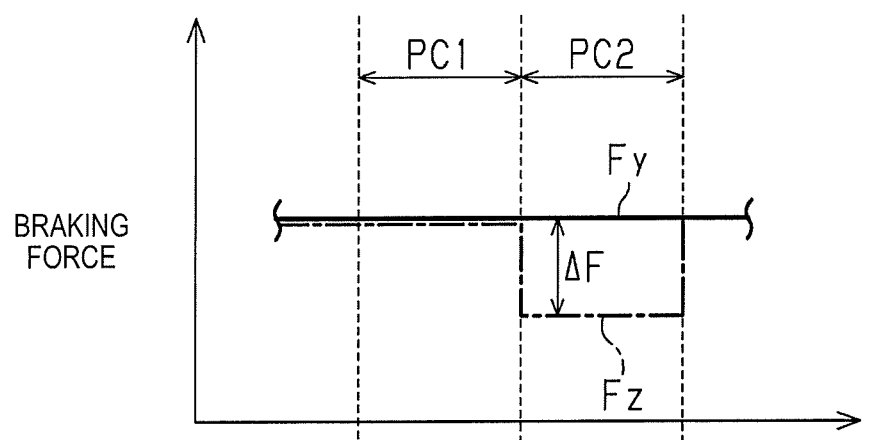
FIG. 6A is a timing chart illustrating transition of a braking force before and after correction and FIG. 6B is a timing chart illustrating transition of an actual speed and an estimated speed.

Specifically, with reference to FIGS. 6A and 6B, a description will be given of a change in a corrected braking force Fz when an external force is applied to the door 20 while a braking force Fy based on a braking condition is being applied to the door 20. As illustrated in FIG. 6A, a period from a first timing T11 to a third timing T13 is a period included in the second period P2 during which the braking force Fy based on the braking condition does not change.

Figure 6B:
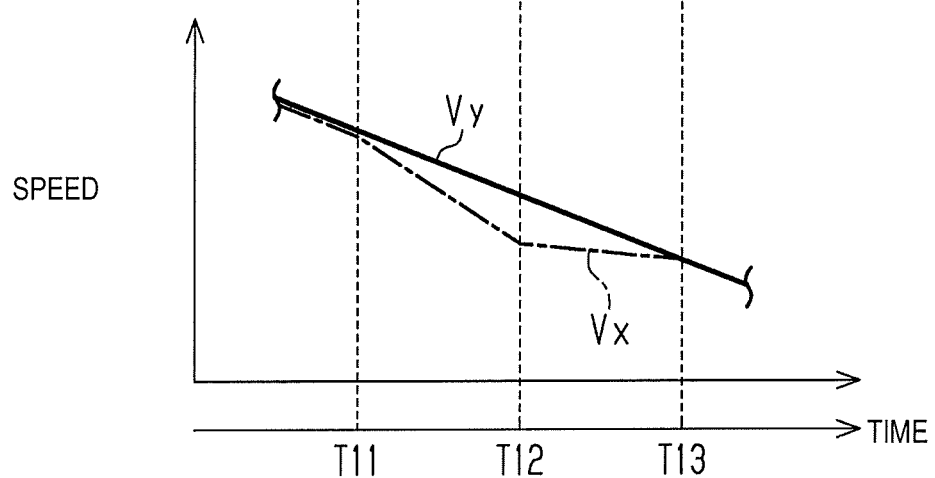

As illustrated in FIGS. 6A and 6B, when an external force is applied to the door 20 at the first timing T11 to decelerate the door 20 that is being opened, in a first correction cycle PC1 from the first timing T11 to the second timing T12, the time gradient Ax of the actual speed Vx is steeper than the time gradient Ay of the estimated speed Vy. Therefore, the braking force Fy is corrected so as to be reduced in a next correction cycle PC, i.e., in second correction cycle PC2 from the second timing T12 to a third timing T13. Specifically, a correction amount (=ΔF) obtained by multiplying the mass of the door 20 by a value obtained by subtracting the time gradient Ax of the actual speed Vx from the time gradient of the estimated speed Vy in the first correction cycle PC1 as illustrated in Equation (1) is added to the braking force Fy based on the braking condition in the second correction cycle PC2. Here, since the value obtained by subtracting the time gradient Ax of the actual speed Vx from the time gradient of the estimated speed Vy in the first correction cycle PC1 is a negative value, the braking force Fz applied to the door 20 in the second correction cycle PC2 is smaller than the braking force Fy based on the braking condition in the second correction cycle PC2. As a result, at the third timing T3 when the second correction cycle PC2 ends, the difference between the actual speed Vx and the estimated speed Vy is eliminated.

In addition, the above description has described a case where the braking force based on the braking condition in the second period P2 is corrected, but is also equally applied to the first period P1 and the third period P3 during which the braking force changes and the fourth period P4 during which the braking force does not change.

Effects of the present embodiment will be described.

(1) The door control device 50 corrects the braking force based on the braking condition when an external force acts on the door 20 due to influence of wind and the like during braking of the door 20. In this way, the door control device 50 may prevent the door 20 from stopping at a position deviated from the target stop position due to action of an external force in terms of correcting the braking force applied to the door 20. That is, the door control device 50 may improve precision of the stop position of the door 20.

(2) The door control device 50 determines whether or not to correct the braking force based on the braking condition according to the time gradient difference ΔA. Therefore, the door control device 50 may prevent correction of the braking force based on the braking condition when the time gradient Ax of the actual speed Vx changes greatly due to calculation precision of the actual speed Vx.

(3) The braking condition includes the first period P1, the second period P2, the third period P3, and the fourth period P4 illustrated in FIG. 3. Therefore, the door control device 50 may prevent a sudden change in the braking force applied to the door 20 at the timing when braking is started based on the braking condition and the timing when the door 20 stops. Therefore, the door control device 50 may prevent the occupant from feeling uncomfortable in the behavior of the door at the time of braking of the door 20.

(4) The door control device 50 determines the braking start timing based on the braking condition on the basis of the distance from the current position to the obstacle 100, the stop distance L2, and the reference distance L3. Therefore, the door control device 50 may start braking of the door 20 based on the braking condition at the timing when the door 20 needs to be braked.

(5) In a case where the correction cycle PC of determining whether or not to correct the braking force based on the braking condition is short, when the calculated actual speed Vx includes an error, the error tends to affect calculation precision of the time gradient Ax of the actual speed Vx. In this case, there is a possibility that the braking force based on the braking condition is inadvertently corrected due to the error. In this regard, according to the present embodiment, the correction cycle PC of determining whether or not to correct the braking force based on the braking condition is longer than at least the determination cycle PD of determining whether or not to start braking based on the braking condition. Accordingly, the door control device 50 may prevent inadvertent correction of the braking force based on the braking condition as much as the correction cycle PC becomes longer.

The present embodiment may be implemented as follows. The present embodiment and the following modifications may be implemented in combination with each other unless technical contractions.

The door control device 50 does not need to execute a processing on the basis of the time gradient difference ΔA. Specifically, in the flowchart illustrated in FIG. 5, the door control device 50 may omit the processing of step S20.

The door control device 50 may change the braking condition as appropriate. For example, in the braking condition illustrated in FIG. 3A, the lengths of the first period P1, the second period P2, the third period P3, and the fourth period P4 may be changed as appropriate. Further, in the braking condition illustrated in FIG. 3A, the second period P2 may be omitted. Further, the braking condition may have only a period corresponding to the second period P2 or the fourth period P4.

The door control device 50 may start braking based on the braking condition when the distance L1 from the door 20 to the obstacle 100 is less than a predetermined distance. In this case, the door control device 50 may make the predetermined distance longer as the actual speed Vx of the door 20 is higher.

The door control device 50 may set a value obtained by multiplying the above-described correction amount (braking force difference ΔF) by a predetermined coefficient to a correction amount.

The determination cycle PD and the correction cycle PC may be the same cycle, or the determination cycle PD may be a cycle longer than the correction cycle PC.

The door control device 50 may be configured as a circuit including one or more processors that operate according to a computer program (software), one or more dedicated hardware circuits such as a dedicated hardware (an application specific integrated circuit (ASIC)) that executes at least some of various processings, or combinations thereof. The processor (controller) includes a CPU and a memory such as a RAM and a ROM, and the memory stores program codes or instructions configured to cause the CPU to execute a processing. The memory, i.e., a storage medium, includes any available medium that may be accessed by a general purpose or dedicated computer.

A door control device according an aspect of this disclosure stops a door rotatably supported by a vehicle body such that the door does not come into contact with an obstacle existing in a rotation range of the door by controlling a braking device that brakes the doors. The door control device includes a distance calculation unit configured to calculate a distance from the door to the obstacle, a speed calculation unit configured to calculate an actual speed of the door, a braking force setting unit configured to set a braking condition indicating transition of a braking force applied to the door, a speed estimation unit configured to estimate, on the basis of the current actual speed, transition of an estimated speed of the door from start of braking based on the braking condition until the door stops, and a braking force correction unit configured to correct, during braking based on the braking condition, a braking force based on the braking condition such that the braking force is increased when a time gradient of the actual speed is gentler than a time gradient of the estimated speed and to correct the braking force based on the braking condition such that the braking force is reduced when the time gradient of the actual speed is steeper than the time gradient of the estimated speed.

The door control device having the above configuration corrects the braking force applied to the door when an external force acts on the door due to influence of wind and the like during braking of the door. Specifically, when the time gradient of the actual speed is gentler than the time gradient of the estimated speed, the door control device assumes that the braking force applied to the door is smaller than an expected force and thus, increases the braking force applied to the door. Further, when the time gradient of the actual speed is steeper than the time gradient of the estimated speed, the door control device assumes that the braking force applied to the door is larger than an expected force and thus, reduces the braking force applied to the door. In this way, in terms of correcting the braking force applied to the door, the door control device may prevent the door from stopping at a position deviated from a position where it is originally desired to stop the door due to action of an external force. That is, the door control device may improve precision of the stop position of the door.

In the door control device described above, it is preferable that the braking force correction unit corrects the braking force based on the braking condition when a magnitude of a difference between the time gradient of the actual speed and the time gradient of the estimated speed is less than a gradient determination value, and does not correct the braking force based on the braking condition when the magnitude of the difference between the time gradient of the actual speed and the time gradient of the estimated speed is equal to or greater than the gradient determination value.

The door control device having the above configuration may not correct the braking force based on the braking condition when the time gradient of the actual speed changes greatly due to calculation precision of the actual speed and the like.

In the door control device described above, it is preferable that the braking condition includes, with lapse of time, a first period of gradually increasing a braking force, a second period of maintaining a braking force at end of the first period, a third period of gradually reducing a braking force at end of the second period, and a fourth period of maintaining a braking force at end of the third period.

The door control device having the above configuration may prevent a sudden change in the braking force applied to the door at the timing when braking based on the braking condition is started and the timing when the door stops. Therefore, the door control device may prevent an occupant from feeling uncomfortable in the behavior of the door at the time of braking of the door.

It is preferable that the door control device further includes a stop distance estimation unit configured to estimate, on the basis of the current actual speed, a stop distance that is a distance from start of braking based on the braking condition until the door stops, and a braking start determination unit configured to determine, on the basis of a distance from a current position of the door to the obstacle and the stop distance, a braking start timing based on the braking condition.

The door control device having the above configuration may start braking based on the braking condition at the timing when the door needs to be braked.

In the door control device described above, it is preferable that a cycle of determining whether or not to correct the braking force based on the braking condition by the braking force correction unit is longer than a cycle of determining whether or not to start braking based on the braking condition by the braking start determination unit.

In a case where a cycle of determining whether or not to correct the braking force based on the braking condition is short, when an error is included in the calculated actual speed, the error tends to affect calculation precision of the time gradient of the actual speed. In this case, there is a possibility that the braking force based on the braking condition is inadvertently corrected due to the error. In this regard, according to the above configuration, a determination cycle of determining whether or not to correct the braking force based on the braking condition is longer than at least a cycle of determining whether or not to start braking based on the braking condition. Accordingly, the door control device may prevent inadvertent correction of the braking force based on the braking condition as much as the cycle of determining whether or not to correct the braking force based on the braking condition becomes longer.

A door control device according another aspect of this disclosure stops a door rotatably supported by a vehicle body such that the door does not come into contact with an obstacle existing in a rotation range of the door by controlling a braking device that brakes the door. The door control device includes a controller, and the controller is configured to calculate a distance from the door to the obstacle, calculate an actual speed of the door, set a braking condition indicating transition of a braking force applied to the door, estimate, on the basis of the current actual speed, transition of an estimated speed of the door from start of braking based on the braking condition until the door stops, and, during braking based on the braking condition, correct a braking force based on the braking condition such that the braking force is increased when a time gradient of the actual speed is gentler than a time gradient of the estimated speed and correct the braking force based on the braking condition such that the braking force is reduced when the time gradient of the actual speed is steeper than the time gradient of the estimated speed.

The door control device may improve precision of the stop position of a door.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door control device that stops a door rotatably supported by a vehicle body such that the door does not come into contact with an obstacle existing in a rotation range of the door by controlling a braking device that brakes the door, the door control device comprising:
   a distance calculation unit configured to calculate a distance from the door to the obstacle;
   a speed calculation unit configured to calculate an actual speed of the door;
   a braking force setting unit configured to set a braking condition indicating transition of a braking force applied to the door;
   a speed estimation unit configured to estimate, on a basis of the current actual speed, transition of an estimated speed of the door from start of braking based on the braking condition until the door stops; and
   a braking force correction unit configured, during braking based on the braking condition, to correct a braking force based on the braking condition such that the braking force is increased when a time gradient of the actual speed is more gradual than a time gradient of the estimated speed and to correct the braking force based on the braking condition such that the braking force is reduced when the time gradient of the actual speed is steeper than the time gradient of the estimated speed.

2. The door control device according to claim 1, wherein the braking force correction unit corrects the braking force based on the braking condition when a magnitude of a difference between the time gradient of the actual speed and the time gradient of the estimated speed is less than a gradient determination value, and does not correct the braking force based on the braking condition when the magnitude of the difference between the time gradient of the actual speed and the time gradient of the estimated speed is equal to or greater than the gradient determination value.

3. The door control device according to claim 1, wherein the braking condition includes, with lapse of time, a first period of gradually increasing a braking force, a second period of maintaining a braking force at end of the first period, a third period of gradually reducing a braking force at end of the second period, and a fourth period of maintaining a braking force at end of the third period.

4. The door control device according to claim 1, further comprising:
   a stop distance estimation unit configured to estimate, on the basis of the current actual speed, a stop distance that is a distance from start of braking based on the braking condition until the door stops; and
   a braking start determination unit configured to determine, on the basis of a distance from a current position of the door to the obstacle and the stop distance, a braking start timing based on the braking condition.

5. The door control device according to claim 4, wherein a cycle of determining whether or not to correct the braking force based on the braking condition by the braking force correction unit is longer than a cycle of determining whether or not to start braking based on the braking condition by the braking start determination unit.

6. A door control device that stops a door rotatably supported by a vehicle body such that the door does not come into contact with an obstacle existing in a rotation range of the door by controlling a braking device that brakes the door, the door control device comprising a controller, wherein
   the controller is configured to:
      calculate a distance from the door to the obstacle;
      calculate an actual speed of the door;
      set a braking condition indicating transition of a braking force applied to the door;
      estimate, on a basis of the current actual speed, transition of an estimated speed of the door from start of braking based on the braking condition until the door stops; and
      during braking based on the braking condition, correct a braking force based on the braking condition such that the braking force is increased when a time gradient of the actual speed is more gradual than a time gradient of the estimated speed and correct the braking force based on the braking condition such that the braking force is reduced when the time gradient of the actual speed is steeper than the time gradient of the estimated speed.

* * * * *